(12) United States Patent
Breeze-Stringfellow et al.

(10) Patent No.: US 9,340,277 B2
(45) Date of Patent: May 17, 2016

(54) AIRFOILS FOR USE IN ROTARY MACHINES

(75) Inventors: Andrew Breeze-Stringfellow, Montgomery, OH (US); Manampathy Gangadharan Giridharan, Mason, OH (US); Syed Arif Khalid, West Chester, OH (US); Leroy H. Smith, Jr., Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 889 days.

(21) Appl. No.: 13/437,476

(22) Filed: Apr. 2, 2012

(65) Prior Publication Data
US 2013/0224031 A1    Aug. 29, 2013

Related U.S. Application Data

(60) Provisional application No. 61/605,041, filed on Feb. 29, 2012.

(51) Int. Cl.
*B64C 11/18* (2006.01)
*F01D 5/14* (2006.01)

(52) U.S. Cl.
CPC .............. *B64C 11/18* (2013.01); *F01D 5/141* (2013.01); *Y02T 50/66* (2013.01)

(58) Field of Classification Search
CPC . F01D 5/141; F05D 2240/301; Y10S 416/02; Y10S 416/05; B64C 11/18; Y02T 50/66
USPC ................. 416/DIG. 5, DIG. 2, 223 R, 242
See application file for complete search history.

(56) References Cited

U.S. PATENT DOCUMENTS

| | | | | | |
|---|---|---|---|---|---|
| 4,325,675 | A | * | 4/1982 | Gallot | B64C 27/467 416/223 R |
| 4,427,168 | A | * | 1/1984 | McKinney | B64C 3/48 244/214 |
| 4,431,376 | A | * | 2/1984 | Lubenstein et al. | 416/223 A |

(Continued)

FOREIGN PATENT DOCUMENTS

| | | |
|---|---|---|
| CN | 1031680 A | 3/1989 |
| EP | 0306434 A2 | 3/1989 |

OTHER PUBLICATIONS

Office Action issued in connection with corresponding CN Application No. 201310063247.3 on Nov. 19, 2015.

*Primary Examiner* — Richard Edgar
*Assistant Examiner* — Eldon Brockman
(74) *Attorney, Agent, or Firm* — General Electric Company; William Scott Andes

(57) ABSTRACT

An airfoil section of a propeller for a propulsion device includes a pressure surface and a suction surface, the pressure surface and suction surface intersecting at a leading edge and a trailing edge. The airfoil section has a meanline defined midway between the pressure surface and the suction surface and a meanline angle is defined as an angle between a tangent to the meanline and a centerline of the propeller. The blade has a meanline curvature defined as the slope of a meanline angle with respect to chord fraction along the meanline, and at least a portion of the meanline has a meanline curvature that increases from between approximately 0.1 chord fraction progressing toward the leading edge and at least a portion of the meanline has a meanline curvature that decreases from between approximately 0.1 chord fraction progressing toward the leading edge.

23 Claims, 5 Drawing Sheets

(56) References Cited

U.S. PATENT DOCUMENTS

| | | | |
|---|---|---|---|
| 4,459,083 A * | 7/1984 | Bingham | 416/223 R |
| 4,652,213 A * | 3/1987 | Thibert | B64C 11/18 244/35 R |
| 4,773,825 A * | 9/1988 | Rodde et al. | 416/223 R |
| 4,784,575 A * | 11/1988 | Nelson et al. | 416/226 |
| 4,830,574 A * | 5/1989 | Wainauski et al. | 416/223 R |
| 4,941,803 A * | 7/1990 | Wainauski et al. | 416/242 |
| 4,976,102 A | 12/1990 | Taylor | |
| 5,911,559 A * | 6/1999 | Menthe | 416/223 R |
| 6,733,240 B2 | 5/2004 | Gliebe | |
| 6,899,525 B2 * | 5/2005 | Vanmoor | 416/223 R |
| 2005/0232778 A1 * | 10/2005 | Kakishita | F01D 5/141 416/223 R |
| 2008/0118362 A1 | 5/2008 | Hu et al. | |
| 2009/0013532 A1 | 1/2009 | Wood et al. | |
| 2013/0156583 A1 | 6/2013 | Wood | |
| 2013/0164488 A1 | 6/2013 | Wood et al. | |

* cited by examiner

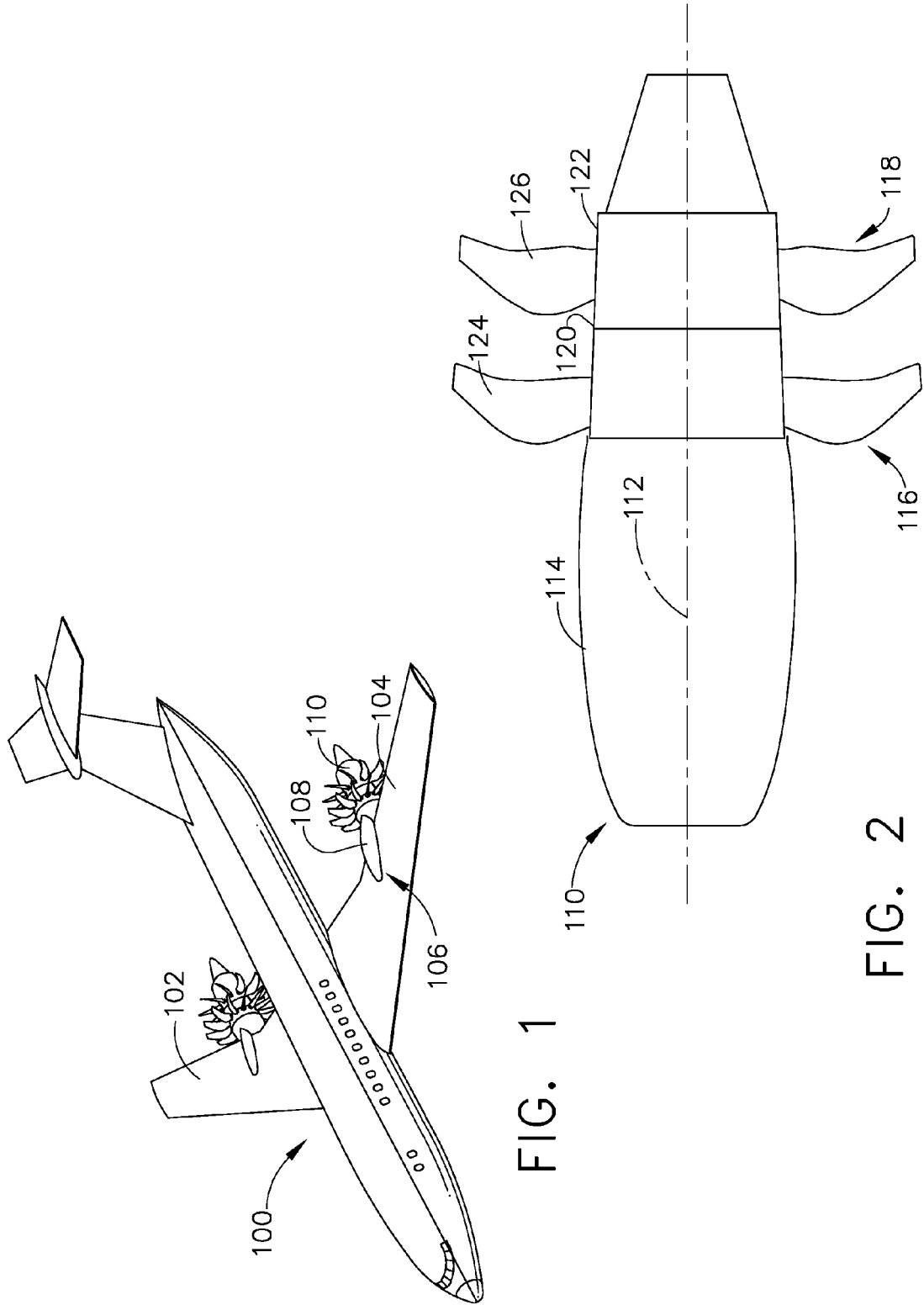

AIRFOILS FOR USE IN ROTARY MACHINES

CROSS REFERENCE TO RELATED APPLICATIONS

This application claims priority to provisional application No. 61/605,041, filed Feb. 29, 2012, the disclosure of which is hereby incorporated by reference in its entirety.

BACKGROUND

The field of the present disclosure relates generally to rotary machines, and more particularly to airfoils used with rotary machines.

At least some known rotary machines such as, gas turbine engines used for aircraft propulsion, include a plurality of rotating blades that channel air downstream. Each blade has a cross-sectional shape that defines an airfoil section. Conventional single rotation turboprop engines provide high efficiency at low cruise speeds (flight Mach number up to about 0.7), although some single rotation turboprop engines have been considered for higher cruise speeds. Higher cruise speeds (Mach 0.7 to 0.9) are typically achieved using a ducted turbofan engine to produce the relatively high thrust required.

Unducted, counter-rotating propeller engines, frequently referred to as the unducted fan (UDF®), or open-rotor, have been developed to deliver the high thrust required for high cruise speeds with higher efficiency than ducted turbofans. Counter-rotating propellers for high cruise speed efficiency have strong acoustic interactions (i.e., noise generation) at low flight speed, such as takeoff, typically at flight Mach number of 0.3 or less. Counter-rotating propellers designed for quiet operation at low flight speed tend to be inefficient at high cruise speeds. Thus, a need exists for both single rotation and counter-rotating propellers that have both good efficiency at high flight speed and low noise at low flight speed.

To operate at a wide range of operating conditions, propeller blades are typically attached to rotating hubs such that each blade setting angle, or pitch, can be adjusted during flight. Although this adjustment of blade pitch angle affects performance, because the blades are essentially rigid, the airfoil sections that comprise a blade are shaped in a specific way to improve both efficiency at high speed flight and reduce noise at low speed flight. Thus, a need exists for propellers that have both high efficiency and low noise at high speed.

BRIEF DESCRIPTION

In one aspect, an airfoil section of a propeller for a propulsion device includes a pressure surface and a suction surface, the pressure surface and suction surface intersecting at a leading edge and a trailing edge. The airfoil section has a meanline defined midway between the pressure surface and the suction surface and a meanline angle is defined as an angle between a tangent to the meanline and a centerline of the propeller. The blade has a meanline curvature defined as the slope of a meanline angle with respect to chord fraction along the meanline, and at least a portion of the meanline has meanline curvature that increases from between approximately 0.1 chord fraction progressing toward the leading edge and at least another portion of the meanline has meanline curvature decreases from between approximately 0.1 chord fraction progressing toward the leading edge.

In another aspect, an airfoil section for a propeller for a propulsion device includes a pressure surface and a suction surface, the pressure surface and suction surface intersecting at a leading edge and a trailing edge. The airfoil section has a meanline defined midway between the pressure surface and the suction surface and a meanline angle is defined as an angle between a tangent to the meanline and a centerline of the propeller. The airfoil section has a meanline curvature defined as a slope of the meanline angle with respect to chord fraction along the meanline, and a thickness of the airfoil section is defined as a distance measured normal to the meanline between the pressure surface and the suction surface, and wherein the airfoil has a maximum thickness located between about 0.15 and about 0.25 chord fraction.

In yet another aspect, an open rotor propulsion device includes a plurality of propeller blades, each of the propeller blades having at least one airfoil section comprising a pressure surface and a suction surface. The pressure surface and suction surface intersect at a leading edge and a trailing edge. The at least one airfoil section has a meanline defined midway between the pressure surface and the suction surface. A meanline angle is defined as an angle between a tangent to the meanline and a centerline of the propeller blade, and the meanline has a meanline curvature defined as the slope of a meanline angle with respect to chord fraction along the meanline. The at least one airfoil section meets at least one of conditions (A) and (B), wherein: (A) is at least a portion of the meanline has meanline curvature that increases from between approximately 0.1 chord fraction progressing toward the leading edge and at least another portion of the meanline has meanline curvature that decreases from between approximately 0.1 chord fraction progressing toward the leading edge; and (B) is a thickness of the airfoil is defined as a distance measured normal to the meanline between the pressure surface and the suction surface, and wherein the airfoil has a maximum thickness ratio located between about 0.15 to about 0.25 chord fraction, and the thickness ratio is 0.8 or greater at approximately 0.1 chord fraction.

BRIEF DESCRIPTION OF THE DRAWINGS

FIG. 1 is an illustration of an aircraft including an exemplary propulsion device.

FIG. 2 is a side view of the exemplary propulsion device shown in FIG. 1.

DETAILED DESCRIPTION

Figure 3:
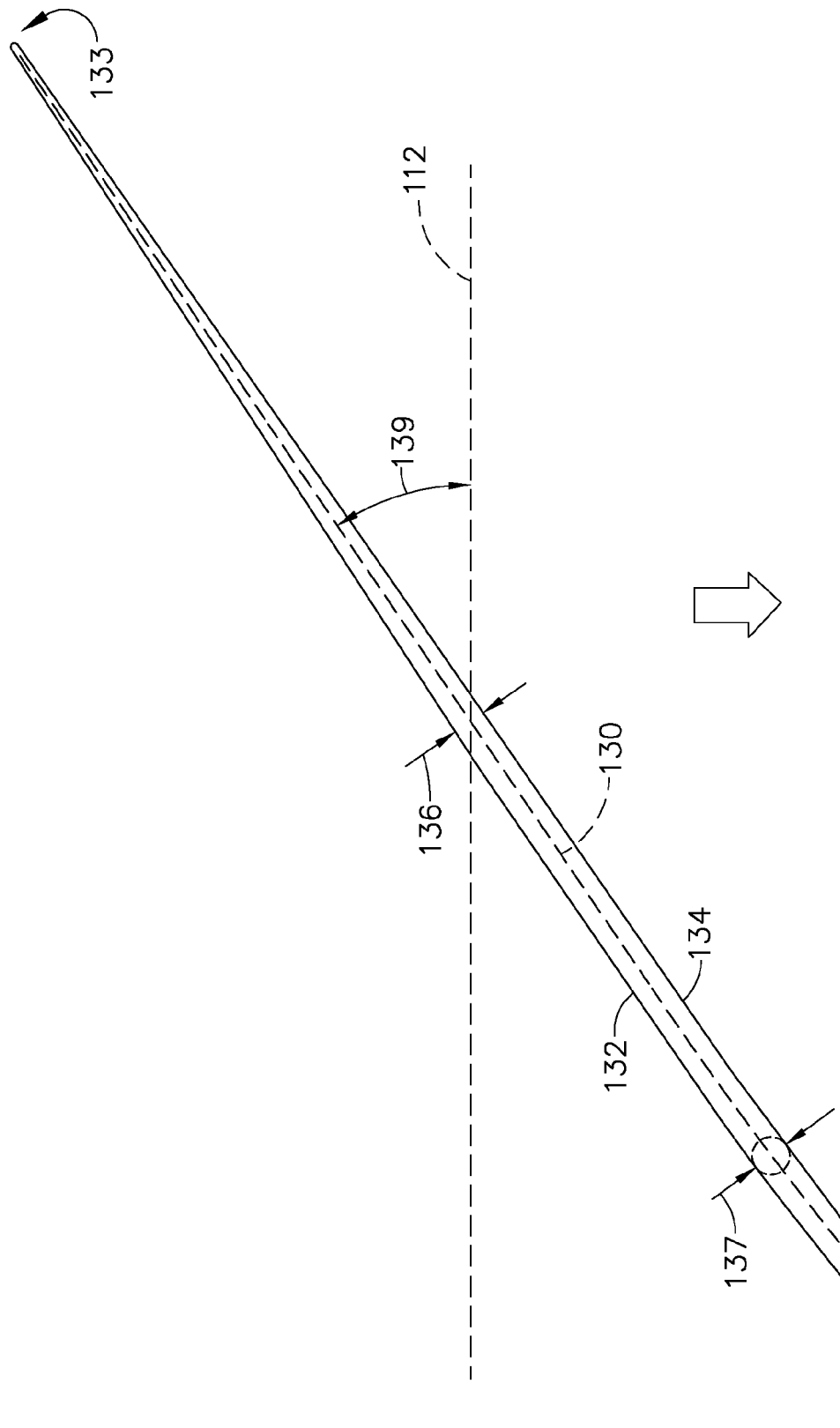
FIG. 3 shows a profile of an exemplary airfoil section of a rotor blade of the propulsion device shown in FIG. 2.

FIG. 1 illustrates an exemplary aircraft 100 including a pair of wings 102 and 104. Each wing 102 and 104 supports a rotary propulsion device 106 via a support 108. In other embodiments, one or more rotary propulsion devices 106 may be mounted to any suitable location on aircraft 100. In another embodiment, propulsion device 106 is a counter-rotating propeller engine 110.

FIG. 2 illustrates a side view of counter-rotating propeller engine 110. Counter-rotating propeller engine 110 has a longitudinal centerline 112. In the exemplary embodiment, an engine cowling 114 is disposed co-axially with centerline 112. Counter-rotating propeller engine 110 includes a core including a compressor, a combustor and a turbine, which may be a multi-stage turbine.

In the exemplary embodiment, counter-rotating propeller engine 110 includes an engine cowling 114 which houses a power generating rotary machine (not shown). The rotary machine is coupled to a first set of rotor blades 116 and a second set of rotor blades 118. In operation, first set of rotor blades 116 and second set of rotor blades 118 are in counter-rotation. First set of rotor blades 116 rotates about hub 120 and second set of rotor blades rotates about a second hub 122, which are arranged co-axially with centerline 112. Each of first set of rotor blades 116 and second set of rotor blades 118 include a plurality of circumferentially spaced rotor blades 124, 126.

For a rotating propeller blade, a surface of the blade on an advancing side thereof, due to rotation, is referred to as the pressure surface. A surface on the retreating side of the blade, due to rotation, is called a suction surface. The leading edge of a propeller blade is used herein to refer to a three-dimensional curve at which the suction surface and pressure surface meet on an upstream edge of the blade, based on the flight direction. A trailing edge refers to an intersection of the same suction surface and pressure surface on the downstream edge of the blade. The mean surface is used herein to refer to the imaginary surface connecting the leading edge to trailing edge, which lies midway between the pressure surface and suction surface.

FIG. 3 shows an airfoil cross section of rotor blade 124 (rotor blade 126 may be similarly shaped) between a blade attachment point to hub 116 (shown in FIG. 1) and a tip of rotor blade 124 viewed radially downward toward centerline 112. Rotation direction of blade 124 is indicated as a directional arrow in FIG. 3. In FIG. 3, the blade surfaces appear as curves and the edges appear as points. In the exemplary embodiment, blade 124 includes a pressure surface 134, a suction surface 132, a leading edge 131, and a trailing edge 133 (although FIG. 3 is a 2-dimensional illustration of blade 124, similar conventions are used for the three-dimensional blade). Meanline 130, which may also be referred to as the camber line, is a two-dimensional view of the mean surface of blade 124.

In the exemplary embodiment, an airfoil section of blade 124 has a meanline angle 139, which refers to the angle between the tangent to meanline 130 and centerline 112. Meanline angle 139 can be measured at any location along meanline 130, and is illustrated in FIG. 3 at approximately midway between leading edge 131 and trailing edge 133. Thickness 136 is a distance measured normal to the meanline between the pressure surface 134 and suction surface 132, which can be measured at any location along meanline. Thickness 136 is illustrated in FIG. 3 as the distance between two opposing arrows at a location approximately midway between leading edge 131 and trailing edge 133. Chord is defined as a straight line distance between leading edge 131 and trailing edge 133. A location along meanline 130 of either meanline angle 139 or thickness 136 may be approximated by a chord fraction. As used herein, chord fraction refers to a distance of the location from leading edge 131 to a point of interest divided by chord. A maximum thickness 137 of the airfoil section of blade 124 is represented by the diameter of an inscribed circle between pressure surface 134 and suction surface 132. In one embodiment, maximum thickness location 137 is located at approximately 0.2 chord fraction (i.e., 20 percent of the total distance from leading edge 131 to trailing edge 133.

As used herein, camber is defined as a change in meanline angle 139 between any two points along meanline 130. Curvature of meanline 130 is calculated as the derivative, or slope, of meanline angle 139 with respect to chord fraction along meanline 130. Typically, and as used herein, for a propeller airfoil section in which the meanline angle generally decreases from leading edge to trailing edge, camber is expressed as the meanline angle change from one specified point along the meanline to another specified point closer to the leading edge (i.e., positive camber is where the meanline angle increases progressing toward the leading edge). Similarly, curvature is considered positive for an increasing meanline angle in a direction toward the leading edge, although the slope of the meanline angle distribution is mathematically negative for positive curvature.

Figure 4:
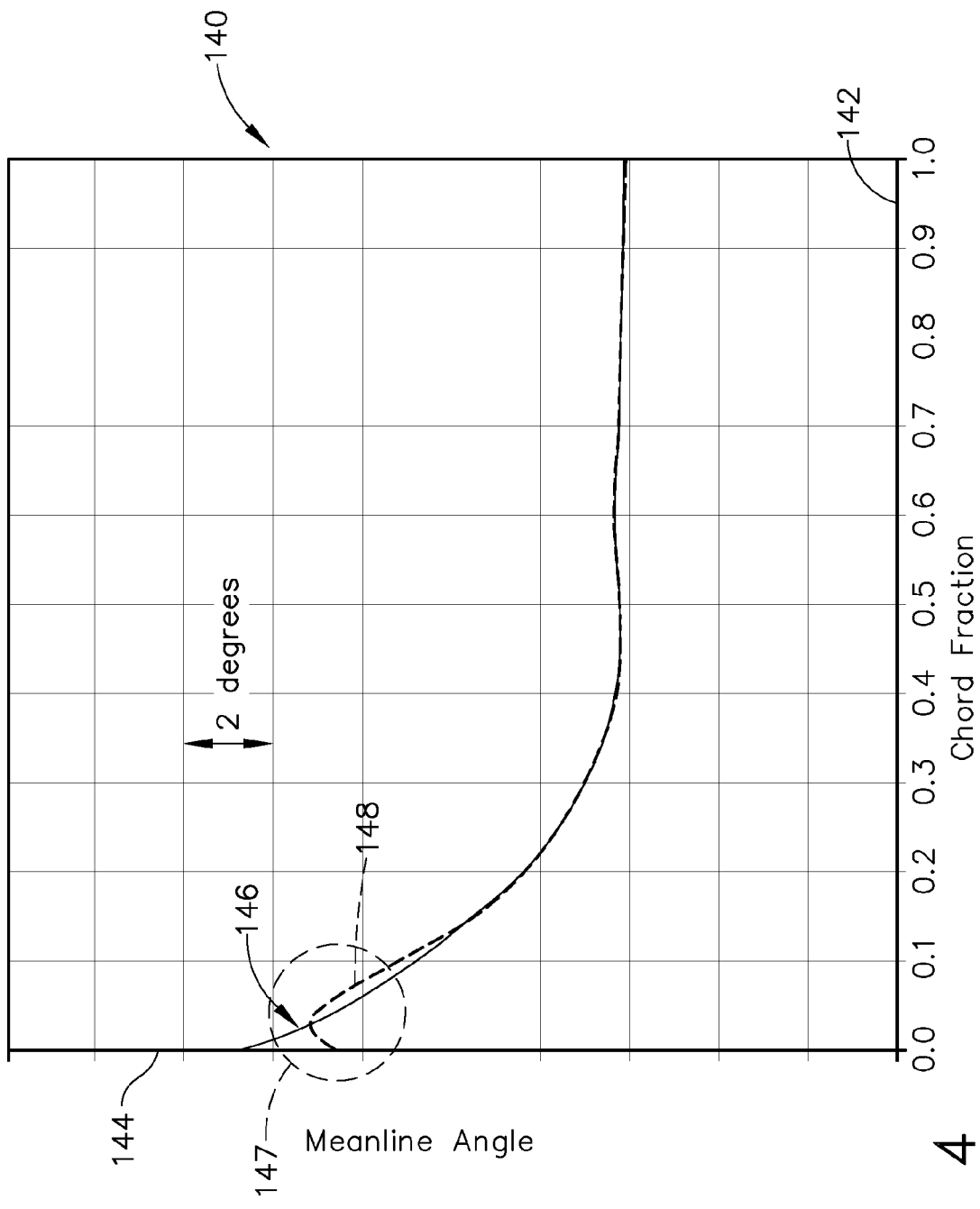
FIG. 4 is a plot of meanline angle as a function of a fraction of chord length of a conventional rotor blade airfoil section and the rotor blade airfoil section of FIG. 3.

FIG. 4 is a graph 140 illustrating meanline angle of two airfoil sections across their respective chord fractions. Graph 140 includes a horizontal axis 142 graduated in units of chord fraction and a vertical axis 144 graduated in degrees. A trace of meanline angle distribution for a conventional low noise airfoil section is indicated as line 146, and a trace of meanline angle distribution for a low noise and high speed efficiency airfoil section (e.g., such as within blade 124 or 126) is indicated as line 148. The conventional low noise airfoil section's meanline angle distribution 146 has an angle increase (i.e. camber) from 0.5 chord fraction to the leading edge that is several degrees more than for a conventional design for high speed efficiency (not shown). The higher camber of conventional low noise airfoil 146, relative to a conventional design for high speed efficiency, tailors the suction surface of the airfoil to reduce flow separation near the leading edge, which would otherwise produce acoustic interactions (i.e., noise generation) with downstream counter-rotating blades or other structures. As shown in FIG. 4, the conventional low noise airfoil's meanline angle distribution 146 is substantially smooth and monotonically increases from about 0.1 chord fraction progressing toward the leading edge. It is noted that the leading edge is represented as 0.0 chord fraction. At high flight speed, conventional low noise airfoil's meanline angle distribution 146 results in flow losses (i.e., an efficiency penalty) near the leading edge thereof due to separated airflow on the pressure surface thereof. In the exemplary embodiment, in region 147 progressing from approximately 0.1 chord fraction toward the leading edge (i.e., chord fraction 0.0), the meanline angle of the low noise and high speed efficiency airfoil 148 initially increases compared to the conventional low noise airfoil's meanline angle distribution 146. However, continuing toward leading edge and over a short distance of approximately 0.05 chord fraction, the increase in meanline angle 148 is less than the increase in meanline angle 146

In one embodiment, the above described region 147, having an increase followed by a decrease in slope of meanline angle distribution 148 as compared to meanline angle distribution 146, is accompanied by a modification to the thickness distribution along meanline 130 of an airfoil section within blade 124 that shifts maximum thickness location 137 forward (toward leading edge 131) from approximately 0.4 chord fraction to approximately 0.2 chord fraction. In the exemplary embodiment, additional thickness is also added to an airfoil section within blade 124 from approximately 0.0 to approximately 0.15 chord fraction, so that suction surface 132 coincides closely to a suction surface of a conventional low noise airfoil section and the thickness ratio greater than 0.8 at 0.1 chord fraction. The resulting pressure surface 134 is thus farther from suction surface 132 than for a conventional low noise airfoil section, thereby increasing a radius of curvature for the airflow around pressure surface 134 near leading edge 131, as compared to a conventional airfoil section, to reduce airflow separation and loss of efficiency in high speed flight.

Figure 5:
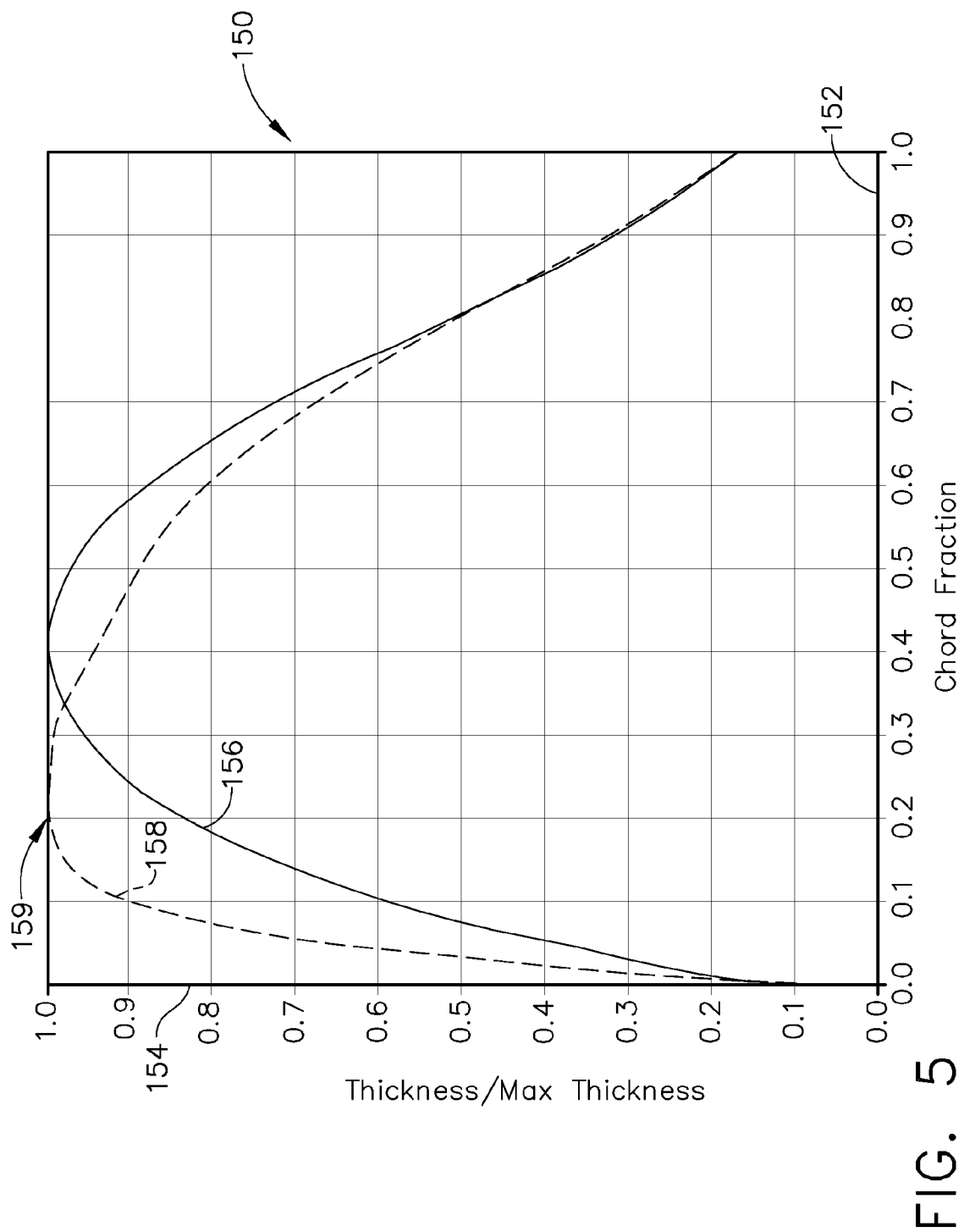
FIG. 5 is a plot of a thickness distribution comparison of a conventional rotor blade compared to the exemplary rotor blade of FIG. 3.

FIG. 5 is a graph 150 illustrating thickness ratios of two airfoil sections across their respective chord fractions. Graph 150 includes a horizontal axis 152 graduated in units of chord fraction and a vertical axis 154 expressed as thickness ratio (i.e., airfoil section thickness at a point of interest divided by its maximum thickness). The conventional low noise airfoil section thickness ratio 156 (as well as for an airfoil section designed solely for high speed efficiency) peaks (i.e., is maximum) at approximately 0.4 chord fraction. In contrast, for the airfoil section of the exemplary embodiment designed for low noise and high efficiency (i.e., within blade 124 or blade 126) thickness ratio 158 is substantially increased in between the 0.0 to 0.20 chord fraction range, as compared to the conventional airfoil section. In one embodiment, a peak thickness 159 of the airfoil section of blade 124 is at approximately 0.20 chord fraction.

Figure 6:
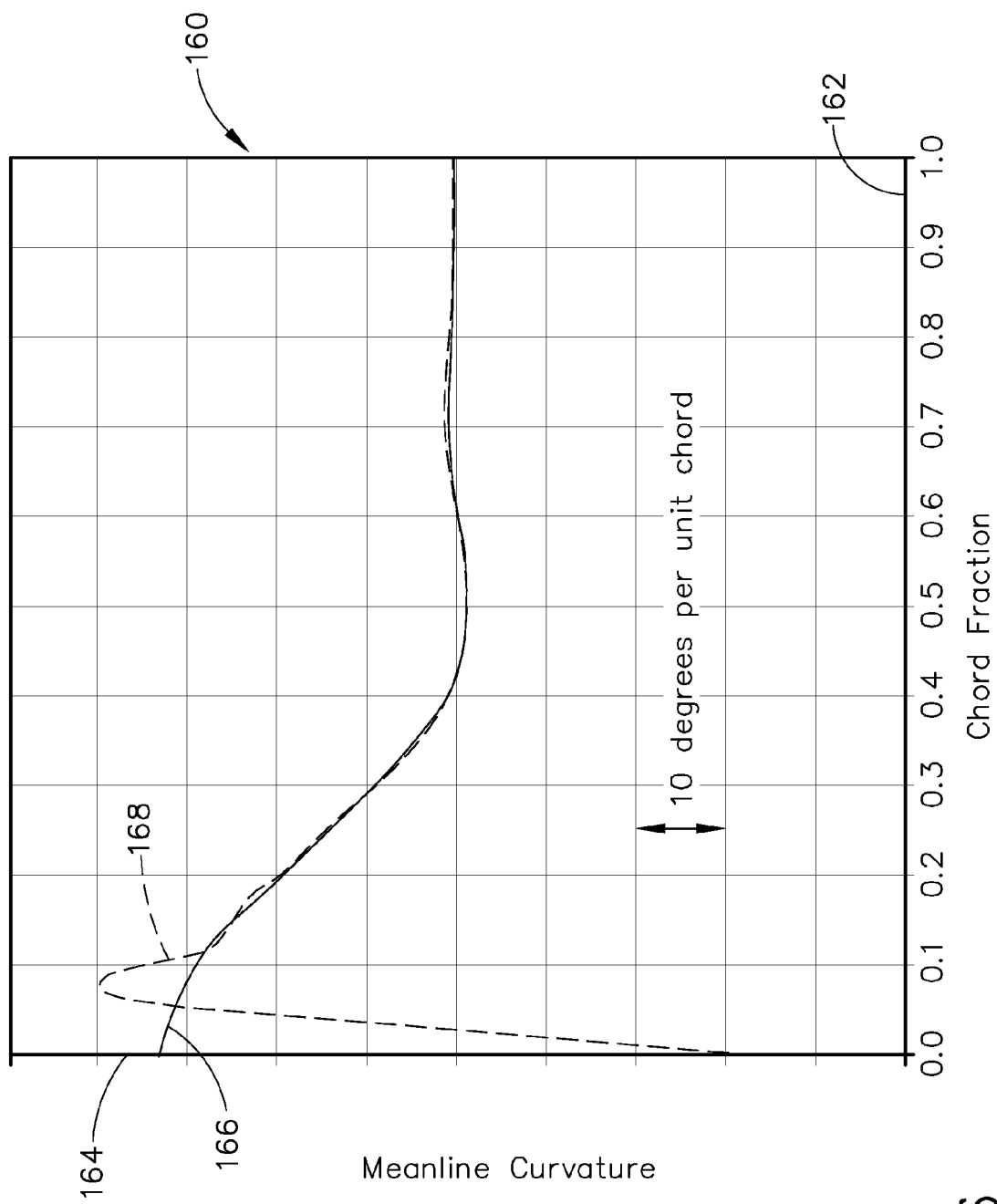
FIG. 6 is a plot of a meanline curvature comparison for a conventional rotor blade and the exemplary rotor blade of FIG. 3.

FIG. 6 is a graph illustrating meanline curvature of two airfoil sections across their respective chord fractions. Graph 160 includes a horizontal axis 162 graduated in units of chord fraction and a vertical axis 164 expressed as camber per unit chord. A trace of curvature distribution 166 for a conventional low noise airfoil section is plotted alongside a trace of curvature distribution 168 of an exemplary low noise and high speed efficiency airfoil section (i.e., within blade 124 or blade 126) on graph 160. For conventional low noise curvature distribution 166, the curvature increases or remains substantially constant from about 0.1 chord fraction to the leading edge. For the exemplary low noise and high speed efficiency airfoil section, the curvature distribution 168 increases then sharply decreases from about 0.1 chord fraction to the leading edge.

In one embodiment, the oscillation in curvature (i.e., the curvature distribution 168 increases then sharply decreases from about 0.1 chord fraction to the leading edge) occurs at least once between 0.1 and about 0.0 chord fraction of blade 124 and is accompanied by thickness distribution that maintains suction surface 132 to be suitable for a low noise airfoil. In one embodiment, the curvature increase and decrease are each about 10 degrees per unit chord in magnitude or greater, and each occurs over less than approximately 0.05 chord fraction. However, other curvature and thickness distributions along the meanline may be used within the scope of the present disclosure.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An airfoil section of a propeller for a propulsion device, comprising:
   a pressure surface and a suction surface, the pressure surface and suction surface intersecting at a leading edge and a trailing edge;
   wherein the airfoil section has a meanline defined midway between the pressure surface and the suction surface; a meanline angle is defined as an angle between a tangent to the meanline and a centerline of the propeller; the blade has a meanline curvature defined as the slope of a meanline angle with respect to chord fraction along the meanline, and at least a portion of the meanline has meanline curvature that increases from between approximately 0.1 chord fraction progressing toward the leading edge followed by at least another portion of the meanline in which meanline curvature decreases from between approximately 0.1 chord fraction progressing toward the leading edge and the magnitude of the decrease in meanline curvature is 40 degrees per unit chord or greater.

2. The airfoil section according to claim 1, wherein the increase in meanline curvature occurs over an extent of less than about 0.05 chord fraction and the decrease in meanline curvature occurs over an extent of less than about 0.05 chord fraction.

3. The airfoil section according to claim 1, wherein the magnitude of the increase in meanline curvature is 10 degrees per unit chord or greater.

4. The airfoil section according to claim 1, wherein a thickness of the airfoil section is defined as a distance measured normal to the meanline between the pressure surface and the suction surface, and wherein the thickness is a maximum between about 0.15 and about 0.25 chord fraction.

5. The airfoil section according to claim 1, wherein a thickness of the airfoil section is defined as a distance measured normal to the meanline between the pressure surface and the suction surface, a thickness ratio is defined as the thickness divided by a maximum thickness of the airfoil section, and the thickness ratio is 0.8 or greater at 0.1 chord fraction.

6. The airfoil section according to claim 1, wherein the airfoil section is configured to operate at a flight speed between about Mach 0.7 to about 0.9.

7. An open rotor propulsion device, comprising:
   a plurality of propeller blades, each of the propeller blades having at least one airfoil section comprising a pressure surface and a suction surface, the pressure surface and suction surface intersecting at a leading edge and a trailing edge; wherein the at least one airfoil section has a meanline defined midway between the pressure surface and the suction surface; a meanline angle is defined as an angle between a tangent to the meanline and a centerline of the propeller blade; the meanline has a meanline curvature defined as the slope of a meanline angle with respect to chord fraction along the meanline,
   wherein at least one airfoil section meets condition (A) or both condition (A) and condition (B), wherein:
   (A) at least a portion of the meanline has meanline curvature that increases from between approximately 0.1 chord fraction progressing toward the leading edge followed by at least another portion of the meanline in which meanline curvature decreases from between approximately 0.1 chord fraction progressing toward the leading edge and the magnitude of the decrease in meanline curvature is 40 degrees per unit chord or greater; and
   (B) a thickness of the airfoil is defined as a distance measured normal to the meanline between the pressure surface and the suction surface, a thickness ratio is defined as the thickness divided by a maximum thickness of the airfoil section, and wherein the airfoil has a maximum thickness ratio located between about 0.15 to about 0.25 chord fraction, and the thickness ratio is 0.8 or greater at approximately 0.1 chord fraction.

8. The propulsion device according to claim 7, wherein all of the propeller blades comprise an airfoil section that meets condition (A).

9. The propulsion device according to claim 7, wherein all of the propeller blades comprise an airfoil section that meets both condition (A) and condition (B).

10. The propulsion device according to claim 7, wherein the device comprises a first set of the propeller blades configured to rotate in a first direction, and a second set of the propeller blades configured to rotate in a second direction opposite the first direction or to be stationary.

11. The propulsion device according to claim 10, wherein each of the blades comprises an airfoil section that has a maximum thickness location at approximately 0.2 chord fraction.

12. The propulsion device according to claim 7, wherein each of the blades comprises an airfoil section having a thickness ratio greater than or equal to 0.8 at a chord fraction of 0.1.

13. The propulsion device according to claim 7, wherein the magnitude of the increase in meanline curvature is 10 degrees per unit chord or greater.

14. The airfoil section according to claim 1, wherein the meanline curvature decrease reaches a negative value.

15. The airfoil section according to claim 3, wherein the meanline curvature decrease reaches a negative value.

16. An airfoil section for a propeller for a propulsion device, comprising:
   a pressure surface and a suction surface, the pressure surface and suction surface intersecting at a leading edge and a trailing edge;
   wherein the airfoil section has a meanline defined midway between the pressure surface and the suction surface; a meanline angle is defined as an angle between a tangent to the meanline and a centerline of the propeller, and at least a portion of the meanline has meanline angle that increases from between approximately 0.1 chord fraction progressing toward the leading edge followed by at least another portion of the meanline in which meanline angle decreases from between approximately 0.1 chord fraction progressing toward the leading edge.

17. The airfoil section according to claim 16, wherein the increase in meanline angle occurs over an extent of less than about 0.05 chord fraction and the decrease in meanline angle occurs over an extent of less than about 0.05 chord fraction.

18. The airfoil section according to claim 16, wherein a thickness of the airfoil section is defined as a distance measured normal to the meanline between the pressure surface and the suction surface, and wherein the thickness is a maximum between about 0.15 and about 0.25 chord fraction.

19. The airfoil section according to claim 16, wherein a thickness of the airfoil section is defined as a distance measured normal to the meanline between the pressure surface and the suction surface, a thickness ratio is defined as the thickness divided by a maximum thickness of the airfoil section, and the thickness ratio is 0.8 or greater at 0.1 chord fraction.

20. The airfoil section according to claim 16, wherein the airfoil section is configured to operate at a flight speed between about Mach 0.7 to about 0.9.

21. The propulsion device according to claim 7, wherein the meanline curvature decrease reaches a negative value.

22. The propulsion device according to claim 13, wherein the meanline curvature decrease reaches a negative value.

23. The propulsion device according to claim 7, wherein the airfoil section is configured to operate at a flight speed between about Mach 0.7 to about 0.9.

* * * * *